US008218020B2

(12) United States Patent
Tenchio et al.

(10) Patent No.: US 8,218,020 B2
(45) Date of Patent: Jul. 10, 2012

(54) PROVIDING CAMERA-BASED SERVICES USING A PORTABLE COMMUNICATION DEVICE

(75) Inventors: Oliver Tenchio, Potsdam (DE); Cueneyt Goektekin, Potsdam (DE)

(73) Assignee: Beyo GmbH, Potsdam (DE)

( * ) Notice: Subject to any disclaimer, the term of this patent is extended or adjusted under 35 U.S.C. 154(b) by 434 days.

(21) Appl. No.: 12/455,252

(22) Filed: May 29, 2009

(65) Prior Publication Data

US 2010/0128131 A1    May 27, 2010

(30) Foreign Application Priority Data

Nov. 21, 2008  (EP) ..................... 08169713

(51) Int. Cl.
 *H04N 5/232* (2006.01)
 *H04N 7/18* (2006.01)
 *G06K 9/72* (2006.01)
 *G06K 7/10* (2006.01)
 *G01W 1/00* (2006.01)

(52) U.S. Cl. ....... 348/211.3; 348/62; 382/229; 382/321; 702/3

(58) Field of Classification Search .............. 348/62, 348/211.3; 382/114, 187, 189, 229, 231, 382/313, 321; 704/2, 3, 8
See application file for complete search history.

(56) References Cited

U.S. PATENT DOCUMENTS

| | | | | |
|---|---|---|---|---|
| 6,473,523 B1 * | 10/2002 | Newman et al. | ............. | 382/176 |
| 7,031,553 B2 * | 4/2006 | Myers et al. | ................. | 382/289 |
| 7,130,801 B2 * | 10/2006 | Kitahara et al. | .............. | 704/277 |
| 7,171,046 B2 * | 1/2007 | Myers et al. | .................. | 382/187 |
| 7,310,605 B2 * | 12/2007 | Janakiraman et al. | ........ | 704/277 |
| 7,805,307 B2 * | 9/2010 | Levin et al. | ................... | 704/260 |
| 7,840,033 B2 * | 11/2010 | Kurzweil et al. | ............. | 382/114 |
| 7,912,289 B2 * | 3/2011 | Kansal et al. | ................. | 382/181 |
| 2001/0019636 A1 * | 9/2001 | Slatter | ........................... | 382/284 |
| 2001/0032070 A1 * | 10/2001 | Teicher | ............................. | 704/2 |
| 2001/0056342 A1 * | 12/2001 | Piehn et al. | ..................... | 704/3 |
| 2002/0037104 A1 * | 3/2002 | Myers et al. | .................. | 382/187 |
| 2002/0051575 A1 * | 5/2002 | Myers et al. | .................. | 382/202 |
| 2003/0120478 A1 * | 6/2003 | Palmquist | ........................ | 704/3 |
| 2003/0169923 A1 * | 9/2003 | Butterworth | ................. | 382/181 |
| 2003/0200078 A1 * | 10/2003 | Luo et al. | .......................... | 704/2 |
| 2005/0221856 A1 * | 10/2005 | Hirano et al. | ................. | 455/557 |
| 2006/0264098 A1 * | 11/2006 | Schneider | ..................... | 439/578 |
| 2008/0002893 A1 * | 1/2008 | Vincent et al. | ................ | 382/229 |
| 2008/0062472 A1 * | 3/2008 | Garg et al. | .................... | 358/402 |
| 2008/0119236 A1 * | 5/2008 | Chen et al. | .................... | 455/566 |
| 2008/0120090 A1 * | 5/2008 | Schurig | ............................. | 704/2 |
| 2008/0221862 A1 * | 9/2008 | Guo et al. | ......................... | 704/2 |
| 2008/0233980 A1 * | 9/2008 | Englund et al. | ............... | 455/466 |
| 2008/0260210 A1 * | 10/2008 | Kobeli et al. | ................ | 382/114 |

(Continued)

*Primary Examiner* — John Villecco
(74) *Attorney, Agent, or Firm* — Mark M Friedman

(57) ABSTRACT

Camera-based services are provided to a user of a portable communication device by recognizing text contained in an image. An image of an environment is captured using a camera within the portable communication device so as to obtain image data. The image data is processed such that text data is recognized and extracted from the image data. Data related to the text data is then output in a form recognizable by a user of the portable communication device. The text data can be processed on the portable communication device to obtain the data related to the text data. Alternatively, the processing is performed by a processing unit external to the portable communication device. Translated and audio versions of the text data are output to the user. One camera-based service provides price and product information related to a product described in an image captured by the camera.

10 Claims, 16 Drawing Sheets

U.S. PATENT DOCUMENTS

| | | | |
|---|---|---|---|
| 2008/0300854 A1* | 12/2008 | Eibye | 704/3 |
| 2009/0048820 A1* | 2/2009 | Buccella | 704/2 |
| 2009/0048821 A1* | 2/2009 | Yam et al. | 704/3 |
| 2009/0063129 A1* | 3/2009 | Tsai et al. | 704/3 |
| 2009/0106016 A1* | 4/2009 | Athsani et al. | 704/3 |
| 2009/0186321 A1* | 7/2009 | Rojas et al. | 434/112 |
| 2009/0198486 A1* | 8/2009 | Chang | 704/2 |
| 2010/0074526 A1* | 3/2010 | Campbell | 382/176 |
| 2011/0019821 A1* | 1/2011 | Kino | 380/255 |
| 2011/0123115 A1* | 5/2011 | Lee et al. | 382/185 |
| 2011/0274373 A1* | 11/2011 | Chaudhury et al. | 382/321 |

* cited by examiner

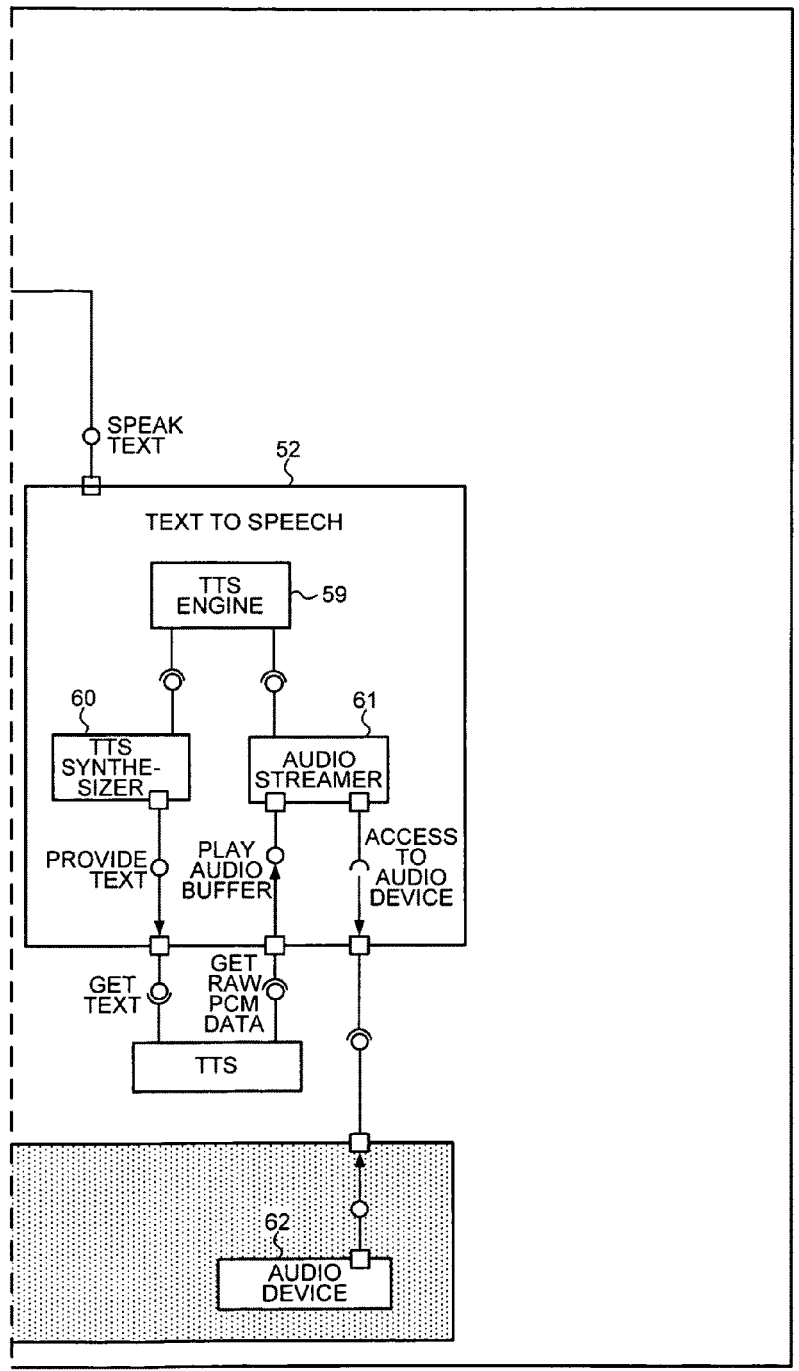
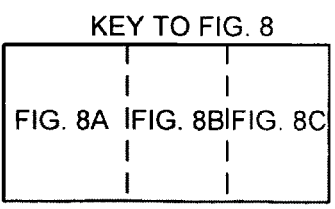
FIG. 8C

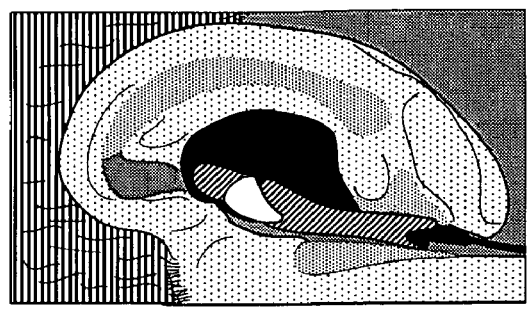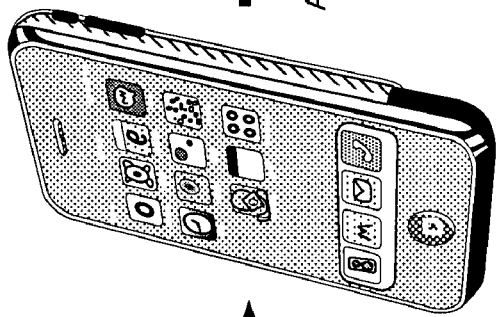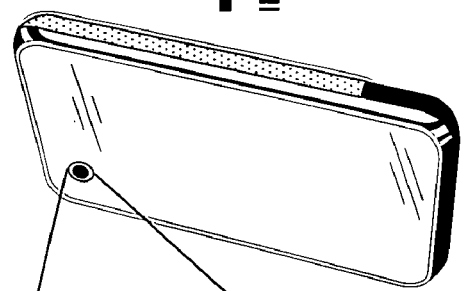
READING ALOUD FOR THE
VISUALLY IMPAIRED
FIG. 13

SERVICES FOR TOURISTS, CONSUMERS AND BUSINESS PEOPLE

PROVIDING CAMERA-BASED SERVICES USING A PORTABLE COMMUNICATION DEVICE

CROSS REFERENCE TO RELATED APPLICATION

This application is based on and hereby claims the benefit under 35 U.S.C. §119 from European Patent Application No. EP 08169713.8, filed on Nov. 21, 2008, in the European Patent Office, the contents of which are incorporated herein by reference. This application is a continuation-in-part of European Patent Application No. EP 08169713.8.

TECHNICAL FIELD

The present invention relates to a method for providing camera-based services to a user using a portable communication device based on text acquired with a camera of the portable communication device.

BACKGROUND

Portable communication devices are widely used in daily life by users wishing to communicate easily and independently of any fixedly installed communication terminals.

Nowadays, such portable communication devices offer a great number of services, including WAP services. In order to use a WAP service, the user must input various data related to the WAP service. Inputting the data is troublesome using a numeric keypad if the portable communication device is, for example, a cell phone or using a small alphanumeric keypad if the portable communication device is, for example, a smartphone.

In addition, a user might want to use a plurality of services for evaluating information based on text shown in the user's environment. Such services, such as obtaining information about a product, are available on the Internet from providers of the product. It is cumbersome, however, to input information using the numeric keypad, and to select the required Internet address using the numeric keypad on a cell phone, for example.

A method is sought for accessing services provided on the Internet from a portable communication device without requiring cumbersome data entry via the keypad of the portable device.

SUMMARY

A method according to the present invention allows a user to input data including text to a portable communication device in a simple manner and to use inputted data in a plurality of services that are provided in connection with the portable communication device. The method accesses camera-based services using the portable communication device of a user. The method includes the steps of capturing an image, processing text data and outputting data related to the text data.

An image of an environment is captured using a camera of the portable communication device of the user. Image data is obtained and processed such that text data is recognized and extracted from the image data. The text data is further processed to obtain data related to the text data. Data related to the text data is output in a form recognizable by the user of the portable communication device.

The processing and further processing is performed either on the portable communication device or by an external processing unit. The external processing unit can include a server. The text data is transmitted from the portable communication device to the external processing unit and further processed by the external processing unit to form the data related to the text data. The data related to the text data is transmitted from the external processing unit to the portable communication device of the user. The external processing unit includes a first server that communicates with the portable communication device via a communication network. In one embodiment, the external processing unit includes a second server that communicates with the first server via a second network.

The processing and further processing is performed by the first server. The second server provides a service for processing the image data and for further processing the text data. The first server is adapted to receive the image data and text data from the portable communication device via the first communication network and to transmit the received image data and text data to the second server for processing and further processing.

The manner of processing and which server performs the processing depends on the service selected by the user of the portable communication device. The first server stores accounting and billing information regarding the service provided by the second server. The service is selected from a plurality of services displayed on a display of the mobile communication device of the user.

In one embodiment, the second server includes a database server for storing the image data, the text data and the data related to the text data for each captured image. The database server enables the portable communication device to access at least one of the image data, the text data and the data related to the text data for the captured image in real-time.

The first server communicates with a personal computer and accesses via the first server data stored on the database server, including the image data, the text data and the data related to the text data for the captured image. The text data and text related data are archived by classifying the text data and text related data by indexing keywords thereof. An Internet service is displayed on the display of the portable communication device of the user using an icon or text data.

In one embodiment, the portable communication device of the user is mounted on a support with a telescopic pullout. The portable communication device is controlled by a separate control unit.

The camera uses actuating means to capture the image. The actuating means enable the user to focus on a desired portion of the environment and to perform automatic release in capturing the image. The image can be rotated and unwarped before obtaining the image data. A user is informed of the quality of the image to be captured by the manner in which the portable communication device vibrates, by a reticule displayed to the user, or by an audio feedback provided by the portable communication device. The camera captures a first image of a first portion of the environment to be displayed in a transparent or semi-transparent manner and then captures a second image of a second portion of the environment to be displayed in a transparent or semi-transparent manner to thereby enable the user to stitch together the first and second images. The position of the user is determined using a position sensor of the portable communication device of the user.

Block recognition is performed on the acquired image to enable parallel processing in text recognition of obtained blocks and to enhance response time.

By storing the image data, the text data and the data related to the text data on a server, the portable communication device can access the image data, the text data and the data related to the text data in real-time. The image data, the text data and the data related to the text data are stored in connection with position data indicating the position where the associated acquired image was captured.

In another embodiment, a portable communication device includes a camera, a display and means for outputting data related to text data. The camera captures an image of the user's environment. The display displays a plurality of services that are selectable by the user of the portable communication device. The means for outputting outputs the data related to text data in a form recognizable by the user of the portable communication device. The portable communication device performs the method for providing camera-based services when the user selects one of the plurality of services.

The portable communication device also includes worker modules, a service module and a control module. One worker module processes the image data such that text data is recognized and extracted from the image data. Another worker module displays the image to be captured on the display and performs an image analysis for detecting the orientation and distortion of text included in the image. Other worker modules perform text recognition and convert the text data into speech for speech output. The control module controls the worker modules and the service module. The service module communicates with a server to request the performance of a service selected by the user. The worker modules work independently of each other. Each worker module communicates with an operating system of the portable communication device via specific interfaces. The client application with its worker modules can be configured through the server without reinstalling the application on the mobile device such that each worker group can also run on the server.

A server includes a first interface and a second interface. The first interface receives image data and text data from the portable communication device via a first communication network. The second interface transmits the received image data and text data to another server in a data format readable by the other server. The other server processes and further processes the image data and text data. The second interface receives the processed and further processed data from the other server. The first interface transmits the processed and further processed data received from the other server in a data format readable by the portable communication device as data related to text data to the portable communication device.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 8A-C are schematic diagrams of the physical structure of the mobile client of FIG. 7, wherein FIG. 8A shows the left part, FIG. 8B shows the middle part, and FIG. 8C shows the right part of the diagram.

FIG. 13 illustrates an offline application performed using recognized text.

DETAILED DESCRIPTION

Reference will now be made in detail to some embodiments of the invention, examples of which are illustrated in the accompanying drawings.

Figure 1:
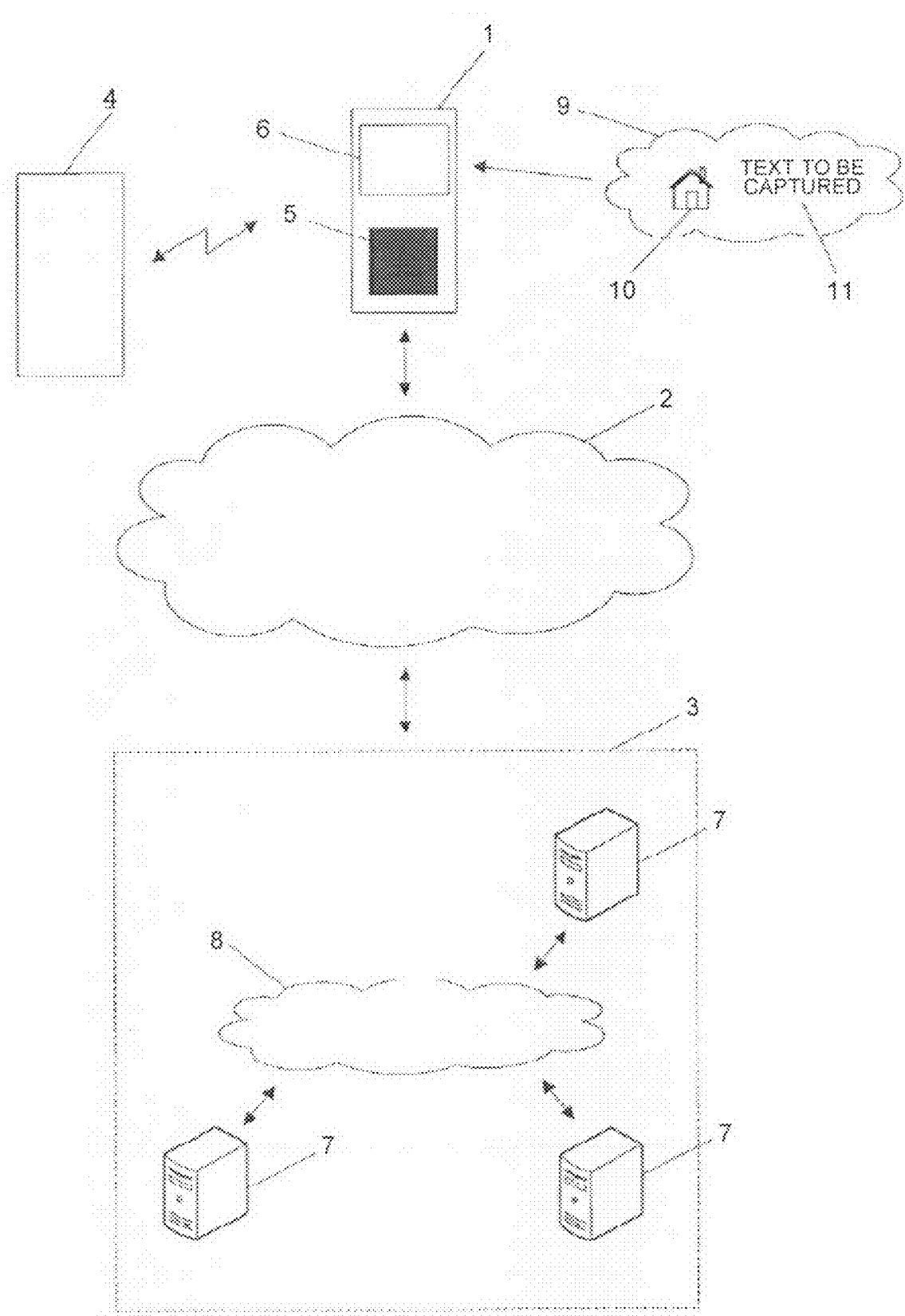
FIG. 1 is a schematic diagram of a system that provides camera-based services to a user of a portable communication device.

FIG. 1 shows a schematic diagram of a system that includes a portable communication device 1, a first network 2, an external processing unit 3 and a separate control unit 4. Portable communication device 1 is a mobile client, mobile phone or similar input device that has a keypad 5, a display 6, a camera and outputting means. External processing unit 3 has at least one server 7 (three are shown in FIG. 1 as an example) and a second network 8. In addition, FIG. 1 shows a scene 9 with a plurality of objects, such as a house 10 and a text object "text to be captured" 11. Portable communication device 1 captures an image from the scene 9 using the camera. Portable communication device 1 can be remote controlled by the separate control unit 4. In one embodiment, separate control unit 4 is a Bluetooth-enabled wireless remote control for portable communication device 1. Portable communication device 1 communicates data to and from external processing unit 3 via first network 2 as shown by the arrows between portable communication device 1 and first network 2 as well as between first network 2 and external processing unit 3.

External processing unit 3 includes server 7 that communicates with other servers within external processing unit 3 via second network 8 as shown by the arrows between the servers 7 and second network 8. First network 2 and second network 8 can be the same network or can be networks different from each other as may be required for a specific application. In one aspect, first network 2 is a mobile communication network, such as a GSM network, and second network 8 is a circuit-switched network or a packet-switched network. In other embodiments, different types of networks are chosen as required by the application being provided to the user.

As used herein, the term "server" sometimes means "service", in which case services communicate with each other via second network 8 when such services are provided on different servers 7, i.e. different computers or computer systems. Alternatively, "services" communicate directly with each other when such services are provided on the same server 7, i.e. the same computer or computer system. In this case, to enable the exchange of data, an appropriate transmission protocol is used, i.e., an appropriate data structure and/or transmission mechanism.

Figure 2:
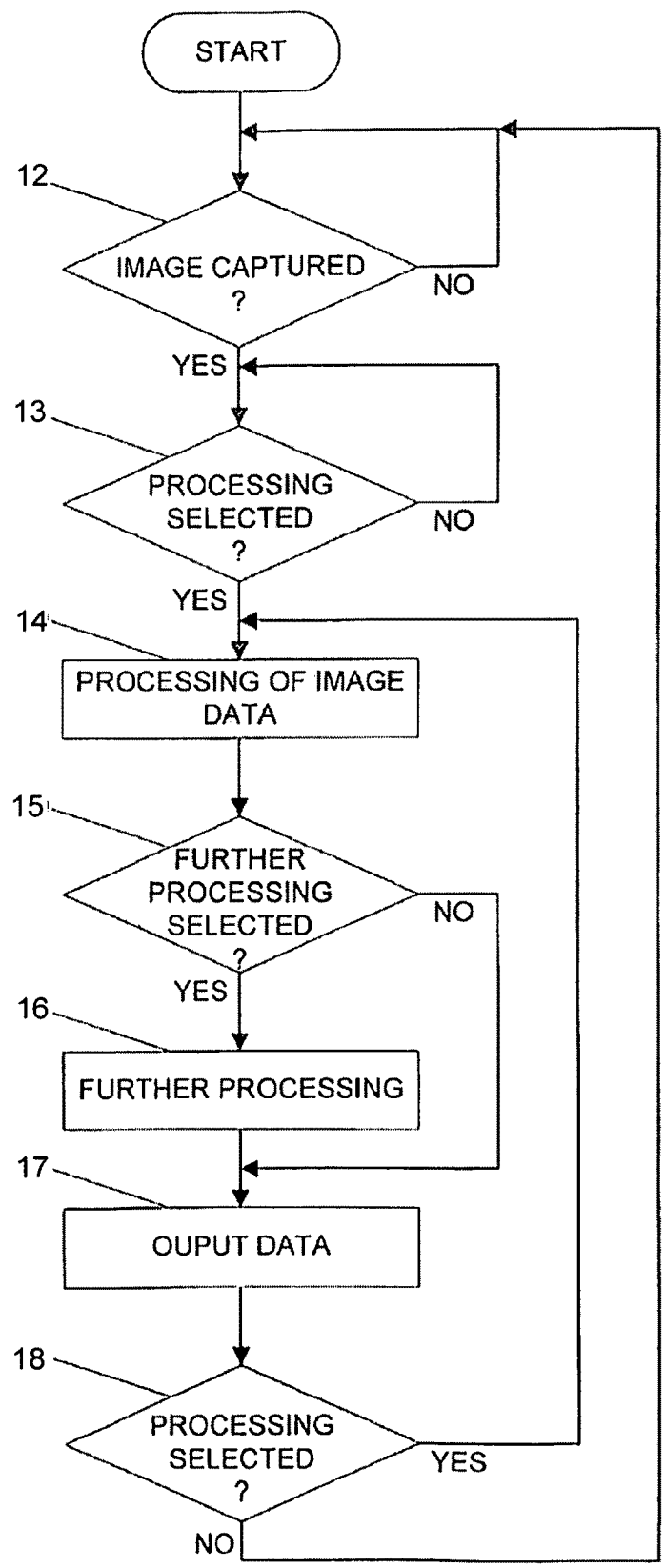
FIG. 2 is a flowchart of a method for providing camera-based services to the user of the portable communication device of FIG. 1.

FIG. 2 is a flowchart illustrating steps 12-18 of a method for providing camera-based services to a user using portable communication device 1. The steps of FIG. 2 will now be described in relation to the system of FIG. 1.

In step 12, the system determines whether or not portable communication device 1 has captured an image to be processed in order to obtain image data. The image to be processed includes a text object, such as text object "text to be captured" 11 shown in FIG. 1 within the scene 9.

In step 13, the system determined whether the user has selected to process the image data. In one example, the user of portable communication device 1 selects the processing of image data by selecting a predetermined processing type from among a plurality of manners of processing shown on display 6 of portable communication device 1. The processing types are shown as icons or text data on display 6 and are selected using keypad 5 of the portable communication device 1. If the answer to step 13 is "NO", indicating that no processing is selected, the flow returns to step 12. If the answer of step 13 is "YES", indicating that a processing type is selected, the flow proceeds to step 14. In step 14, the system performs the processing using the processing type selected by the user.

In step 15, the system determined whether further processing of data obtained by the processing of step 14 is required. If the answer to step 15 is "YES", the flow proceeds to step 16 in which the further processing is performed.

In step 17, data obtained by the processing of step 14 and/or data obtained by the further processing of step 16 are transmitted to portable communication device 1. If the answer to step 15 is "NO", the flow of the method proceeds directly to step 17, in which data obtained by the processing of step 14 are transmitted to the portable communication device 1.

In step 18, the system again determines whether the user has selected a processing type for the image data. If the answer to step 18 is "YES", the flow of the method returns to step 14. If the answer in step 18 is "NO", the flow returns to step 12, and the system waits to capture a new image.

In the general functional principle described above, the image data that is captured includes a text object within scene 9, as shown in FIG. 1 by the text object "text to be captured" 11. Such text object can be captured in step 12 using the camera included in portable communication device 1. The processing in step 14 is performed within the portable communication device 1 or in external processing unit 3 after image data of the captured image is transmitted to external processing unit 3 via first network 2. The processing in step 14 is performed in order to obtain text data by recognizing the text within the text object, such as the text object "text to be captured" 11.

The further processing in step 15, which is an optional feature, can then be performed either in portable communication device 1 or in external processing unit 3 after transmitting the text data to external processing unit 3 via first network 2. Details of such further processing are described below.

The output of data in step 17 is performed in portable communication device 1 such that data either directly or indirectly relating to the text data, i.e. relating to data obtained by processing and/or further processing of the text data, are outputted in a form recognizable (or convertible to a recognizable form) by the user of portable communication device 1, such as written text, speech or the like. The processing and further processing can be performed either in portable communication device 1 or in external processing unit 3, depending of the application the user is using.

The manner of capturing the image data that includes the text object is described below. First, the image can be captured while portable communication device 1 is being held in the hand of the user of portable communication device 1. This is the normal manner of use.

Figure 3:
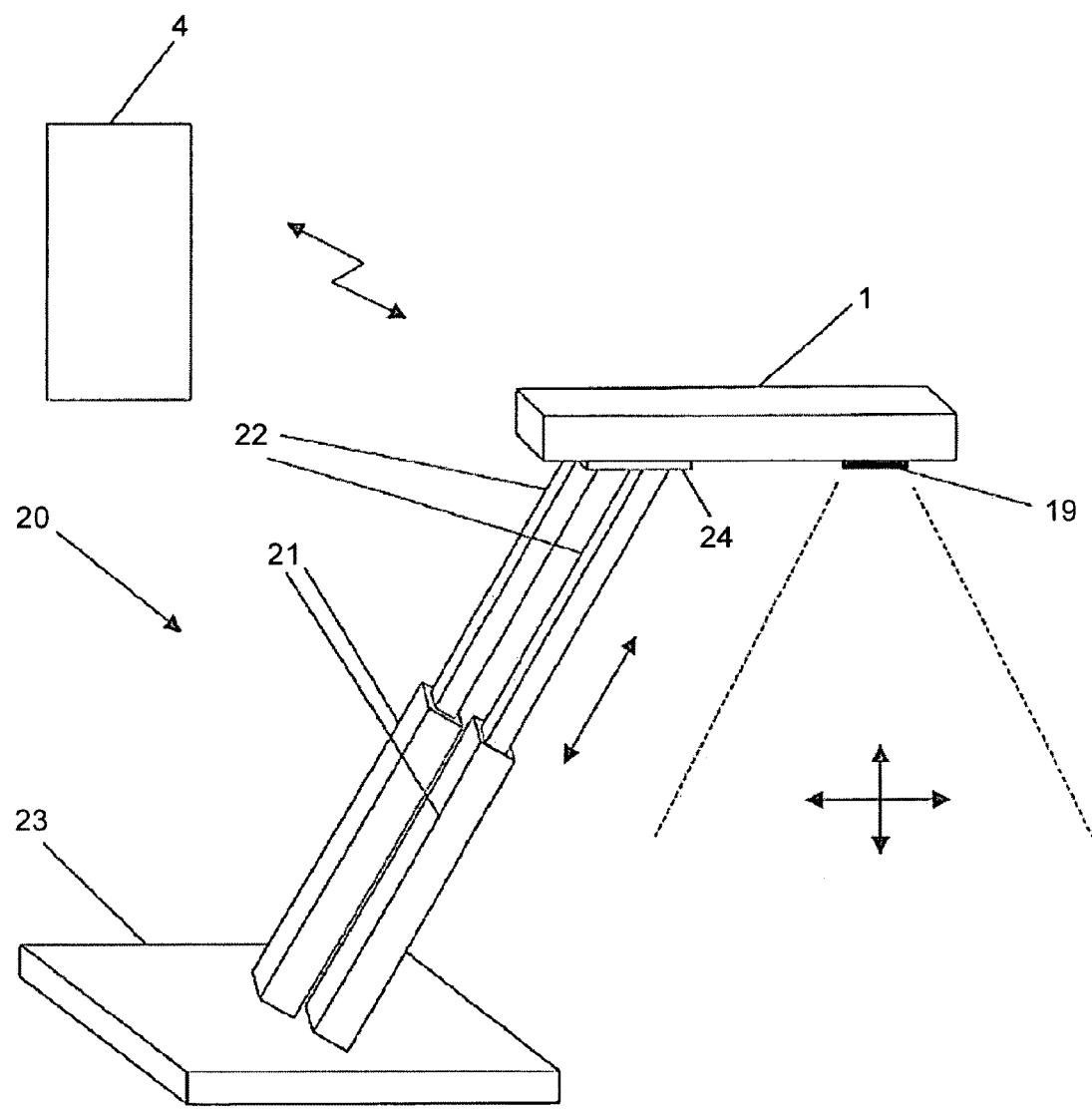
FIG. 3 is a schematic representation of a portable communication device mounted on a support.

FIG. 3 shows another manner of capturing image data. In FIG. 3, portable communication device 1 includes a camera 19 and is mounted on a support 20. In the embodiment of FIG. 3, support 20 is a telescopic pullout that includes two lower rods 21, two upper rods 22, a base 23 and a fastener 24. The two lower rods 21 are attached to the base 23, and the two upper rods 22 are slidably inserted into the two lower rods 21. The fastener 24 is attached to the two upper rods 22 and is adapted to hold the portable communication device 1. By slidably moving the two lower rods 21 in the direction shown by the inclined arrow in FIG. 3, a capturing area of camera 19 is adjusted as is shown by the vertical and horizontal arrows in FIG. 3. Support 20 is not limited to the telescopic support mentioned above, but may be any kind of support arrangement so long as an appropriate capturing area for capturing an image using camera 19 is achieved. While capturing images using support 20, portable communication device 1 can be remotely controlled by separate control unit 4 in the same manner as described above with respect to FIG. 1.

Figure 4:
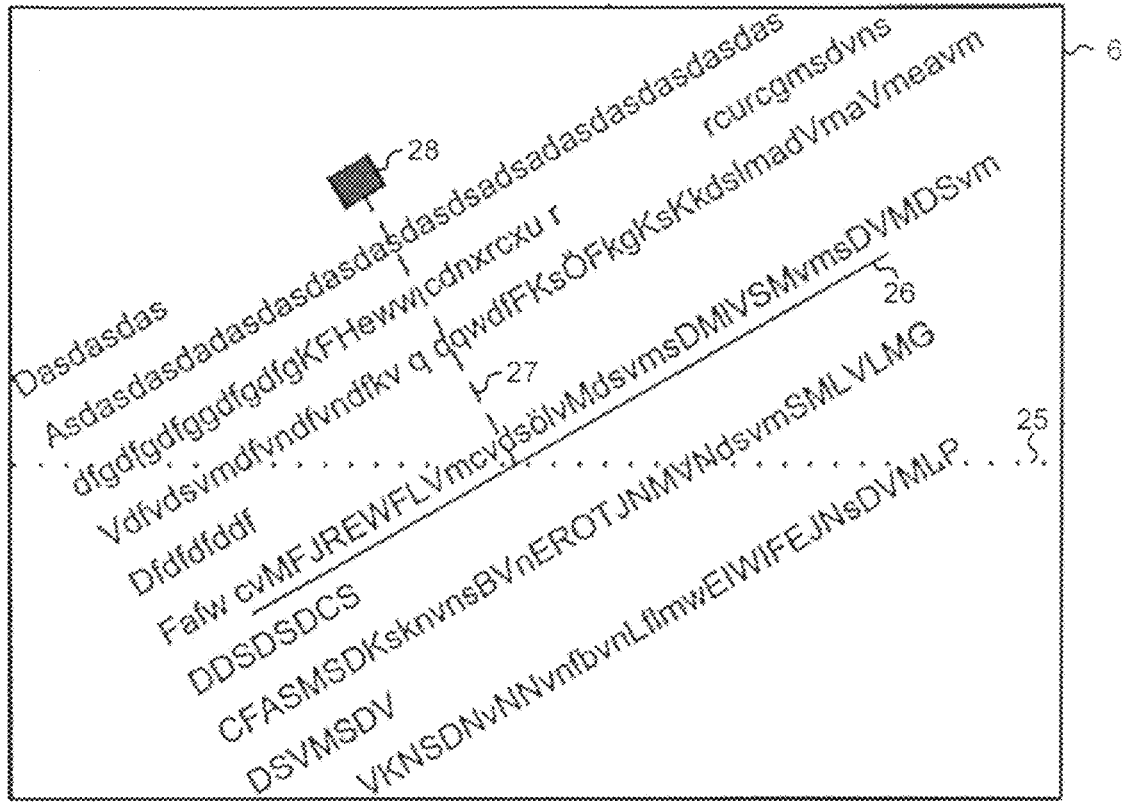
FIG. 4 is a schematic diagram of the display of the portable communication device when an image including a text object is to be captured.

FIG. 4 is a schematic diagram of display 6 of portable communication device 1 showing an image of a text object that is to be captured. When the user wishes to capture an image using camera 19 of portable communication device 1, the user selects a capturing mode such that display 6 shows the image within the capturing area of camera 19. In FIG. 4, a specific reticule is displayed in display 6 to the user. This reticule enables the user of the portable communication device 1 to focus on a desired portion of the environment. The reticule includes a first line 25, a second line 26, and a third line 27. In one embodiment, first line 25 is a horizontal dotted line that helps the user of portable communication device 1 to adjust camera 19 to the text object in the environment that is to be captured. In another embodiment, first line 25 is a solid line of a specific color, such as red. If the text object or the text objects are not adjusted in a suitable manner, portable communication device 1 rotates the image shown in display 6 in a suitable manner such that later text recognition can be performed faster and more reliably.

Second line 26 in FIG. 4 is an inclined continuous line that indicates how a text object would be rotated by portable communication device 1. When the continuous line 26 has a first specific color, such as green, the system is indicating that the text object or text objects are aligned in a suitable manner and can immediately be used without any further rotation. If continuous line 26 has a second specific color, such as red, the system is indicating that the text object or text objects should be rotated by the portable communication device 1 before being processed.

Third line 27 in FIG. 4 is an inclined dashed line that indicates the distortion of the text object or objects. Third line 27 includes a projection point 28 at one end which helps the user to capture the text object without distortion. Projection point 28 assists the user to hold camera 19 as upright as possible with respect to the text object objects to be captured. If the projection point 28 is exactly in the center of the image shown in display 6, then camera 19 is being held exactly upright with respect to the text object or objects to be captured.

Alternatively, in addition to or instead of the reticule displayed to the user, suitable alignment and the resulting quality of the image to be captured can be indicated by actuating a vibrator in portable communication device 1 or by providing audio feedback from portable communication device 1. For example, a faster vibrating or a louder audio feedback indicates that the quality of the image to be captured will be poorer. The actuating means enables the user of camera 19 to focus on the desired portion of the environment. In one embodiment, the actuating means automatically allows the image to be captured when the quality of the image to be captured is acceptable. The actuating means can also include a G-sensor or acceleration sensor to suitably align the image before performing automatic release in capturing the image.

The following processing types can be performed in addition to or instead of the above. In a first processing type, an overall image is acquired by the camera. Using a view finder, an image to be captured is selected from the acquired overall image. Thereafter, image enhancement is performed using adaptive histogram alignment, for example. To correct any error of exposure and to enhance local contrast of the image to be captured, histogram alignment or the like is performed.

Thereafter, rotation analysis is performed. Rotation analysis can include digitization (binarization), differentiation and local Hough analysis. To enhance performance, the image is rescaled to a small size and digitized. Using edge analysis and following local Hough transformation, the system determines the angle at which text in the image to be captured will be rotated as compared to a horizontal line. This can be assisted by displaying an artificial horizon that helps the user of portable communication device 1 in achieving appropriate alignment of the camera and enhances later processing speed.

Data from the G-sensor or accelerometer are read out and indicate the relative position of camera 19. The data from the G-sensor or accelerometer is used to generate a specific view that assists the user in appropriate alignment of camera 19 that avoids distortion if the image to be captured includes a text object for later text recognition.

A second processing type involves segmenting the acquired image into blocks. An image to be captured is acquired by camera 19. If the image is captured using an auto-focus function, the image is captured after the auto-focus function is applied. The captured image data is then stored for example in a JPEG data structure. Thereafter, image enhancement such as adaptive histogram alignment is performed as described above. Segmentation is then performed on continuous blocks for example using region growing or convex Hulls. To enhance speed of later text analysis and to speed up later read out, continuous blocks are segmented.

Rotation analysis is then performed using, for example, digitization, differentiation or local Hough analysis. Because text recognition is difficult using rotated texts, the rotation angle of the captured image is verified and the captured image is inverse rotated. The system determines whether the segmented block contains text that can be analyzed. To save time in later text analysis, continuous blocks are checked for the probability of containing text.

The order of reading out text is determined from the left upper side to the right lower side. Adaptive digitization is performed to enable later text recognition even if poor lighting conditions are present, such as a hard shadow. The text blocks obtained using the segmentation are then used in the later text recognition.

Another processing type involves stitching two or more images together. A first portion of the environment to be displayed is captured in a transparent or semi-transparent manner and thereafter a second portion of the environment to be displayed is captured in a transparent or semi-transparent manner such that the user is enabled to stitch the first and second images together to obtain an overall image to be used for further processing.

Another processing type involves unwarping the text object or text objects to improve the quality of an image by removing any warping effect of a non-planar surface on which the text is written.

After the text object is selected and adjusted using the processing types mentioned above, the text object is then re-captured by actuating the capturing mode of portable communication device 1 to obtain image data corresponding to the text object. Block recognition can be performed on captured image data before processing or further processing. For example, text recognition is performed to enable parallel processing of obtained blocks, wherein one block is processed and another block is prepared. By pipelining the processing, the response time of overall processing is reduced. After the text object is re-captured, the processing described in steps 13-18 is performed.

After image data has been captured and the processing of steps 13-18 has been performed, specific services can be performed. These specific services for processing and/or further processing are described below. Such specific services, however, are not limiting for the present invention but rather are intended to more fully make clear the specific features shown in FIG. 1-2 by way of example.

Figure 5:
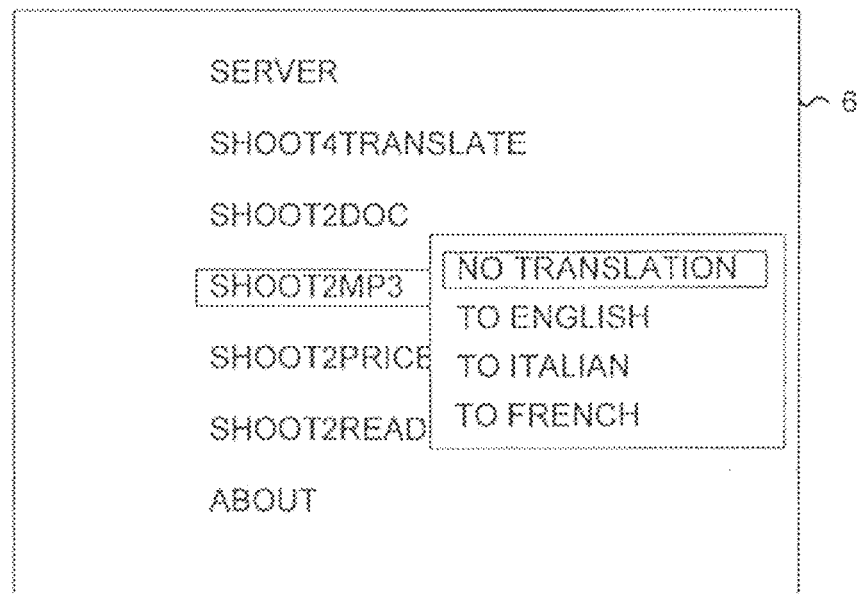
FIG. 5 is a schematic representation of the display of the portable communication device showing how a camera-based service is selected by the user.

FIG. 5 is a schematic representation of display 6 of portable communication device 1 when a specific service is to be performed. In FIG. 5, display 6 of the portable communication device 1 shows different services that a user can select to perform based on an image captured as mentioned above. In FIG. 5, five items "SHOOT4TRANSLATE", "SHOOT2DOC", "SHOOT2MP3", "SHOOT2PRICE" and "SHOOT2READ" are shown by way of example as services that can be selected by the user of portable communication device 1. In addition, two additional items "SERVER" and "ABOUT" appear on display 6. The item "SERVER" enables a user to input an address of a server, such as server 7 of external processing unit 3 shown in FIG. 1. This address is stored and used for services to be selected later by the user when the need arises. The item "ABOUT" enables the user to obtain further information about the program, including all of the services that can be selected by the user. The item "ABOUT" also allows the user to obtain information about licensing and the manner and amount of payment for each service.

In FIG. 5, the service "SHOOT2MP3" has been selected by the user as indicated by the box around the service "SHOOT3MP3". In addition, a subitem "NO TRANSLATION" has been selected as indicated by the box around the subitem "NO TRANSLATION". Although selection options for services are shown in FIG. 5 as being displayed using text data displayed in display 6, service options may also be indicated in other ways. For example, an icon representing a service can be used if user of portable communication device 1 is enabled to select an icon from display 6.

The implementation of the service "SHOOT4TRANSLATE" is described below with reference to FIGS. 1-2. Image data captured as described above are processed in mobile communication device 1 to recognize and extract text data from the image data. Then, the text data are transmitted to server 7 of external processing unit 3, such as a main server designated by the address or name stored during selecting the item "SERVER" beforehand. Alternatively, server 7 is a preset server, in which case the item "SERVER" can be omitted. The text data can be transmitted to server 7 via a WLAN, UMTS network or the like.

Server 7, such as the main server or another service-providing server that receives the text data, then further processes the text data by translating the text data from one language into another language selected beforehand by the user of the portable communication device 1. Data corresponding to the translated text data are then transmitted from server 7 to mobile communication device 1 and are either displayed on display 6 or are converted to speech and read out by an internal speech synthesizer in the portable communication device 1. The transmitted data can also be stored on mobile communication device 1.

The service "SHOOT2DOC" is described below with reference to FIGS. 1-2. Image data captured as mentioned above are transmitted to server 7 of external processing unit 3 that was designated by the address stored during selecting the item "SERVER" beforehand. Server 7 processes the image data to recognize and extract text data from the image data. The text data is analyzed by server 7 and is converted to a text file in a specific format, such as DOC or PDF. The text file is transmitted from server 7 to mobile communication device 1 and is then displayed on display 6 and/or stored.

The service "SHOOT2MP3" involves generating speech data in a file format. Image data are captured and transmitting the data to server 7, which was designated by the address stored during selecting the item "SERVER" beforehand. Server 7 processes the image data to recognize and extract text data from the image data. A speech synthesizer of server 7 reads out the text data to obtain speech data in a specific format such as MP3. The speech data are transmitted from server 7 to mobile communication device 1, stored and played on mobile communication device 1 using an appropriate player, such as RealPlayer. Optionally, the text data can be translated into another language by server 7 before obtaining the speech data.

The service "SHOOT2PRICE" involves determining the price shown on a product display. Image data captured as mentioned above are processed in mobile communication device 1 to recognize and extract text data from the image data. The text data are then transmitted to server 7, such as the main server or another service-providing server of external processing unit 3 that was designated by the address or name stored during selecting the item "SERVER" beforehand. Alternatively, server 7 is a preset server, and the item "SERVER" can be omitted.

In one example, a specific designation of a product such as "CANON EOS 5D" camera has been recognized and extracted from the image data. Server 7, such as the main server, analyses online offers for this product in cooperation with another server 7 of external processing unit 3. Server 7 then transmits data indicating the product name and the lowest price from server 7 to mobile communication device 1, and this information is displayed on display 6. Alternatively, instead of showing the user online offers, the user can be shown product offers available near where the user is located. A position sensor such as a GPS sensor integrated into mobile communication device 1 can be used to select an offer having a low price and being made by a seller near the position of the mobile communication device 1. Such position sensor can also be used with the other services described herein.

The service "SHOOT2READ" involves converting text data to synthesized speech directed on mobile communication device 1. Image data captured as mentioned above are processed in mobile communication device 1 to recognize and extract text data from the image data. The text data is then directly read out by an internal speech synthesizer in mobile communication device 1. Thus, no interaction with external processing unit 3 and/or any server 7 thereof is necessary. Alternatively, text is displayed on display 6 of portable communication device 1 to thereby obtain a service "SHOOT2TEXT" (not shown in FIG. 5).

In performing the services described above, various information can be stored on server 7. The image data, the text data and the data related to the text data of a captured image are stored on server 7 to enable portable communication device 1 to access the image data, the text data or related data in real-time. This allows archiving of the data at a central site. The data is stored in association with position data indicating the position where the captured image was captured. This position information can be obtained by a GPS sensor, for example. If such data stored in connection with position data are displayed at a site where such data or the image data from which such data are derived have been obtained, so-called "geo-tagging" can be performed.

In addition to the specific examples of user-selectable services described above, other services can be provided that do not require any interaction between portable communication device 1 and external processing unit 3 or one of the servers 7. For example, the aforementioned services can be modified such that more of the processing is performed on the portable communication device 1. Furthermore, image data captured at one time can be used for an arbitrary number of services instead of the need to capture image data again before selecting a new service.

The system allows a user to input data to portable communication device 1 in a simple manner using camera 19 instead of typing in data using keypad 5 and to use the inputted data in a great number of services that are provided in connection with portable communication device 1. Portable communication device 1 can be a mobile phone, such as a smartphone, having an integrated camera as well as sufficient memory capacity to store and execute a program having functionalities as mentioned above.

The software that performs the aforementioned functionalities is described in European patent application 07122042.0, which is incorporated herein by reference. Such software is ported to the applications as mentioned above.

Although the present invention has been described above as a method, the specific functionalities can be performed using software executing on the processor of a portable communication device and on a server.

Figure 6:
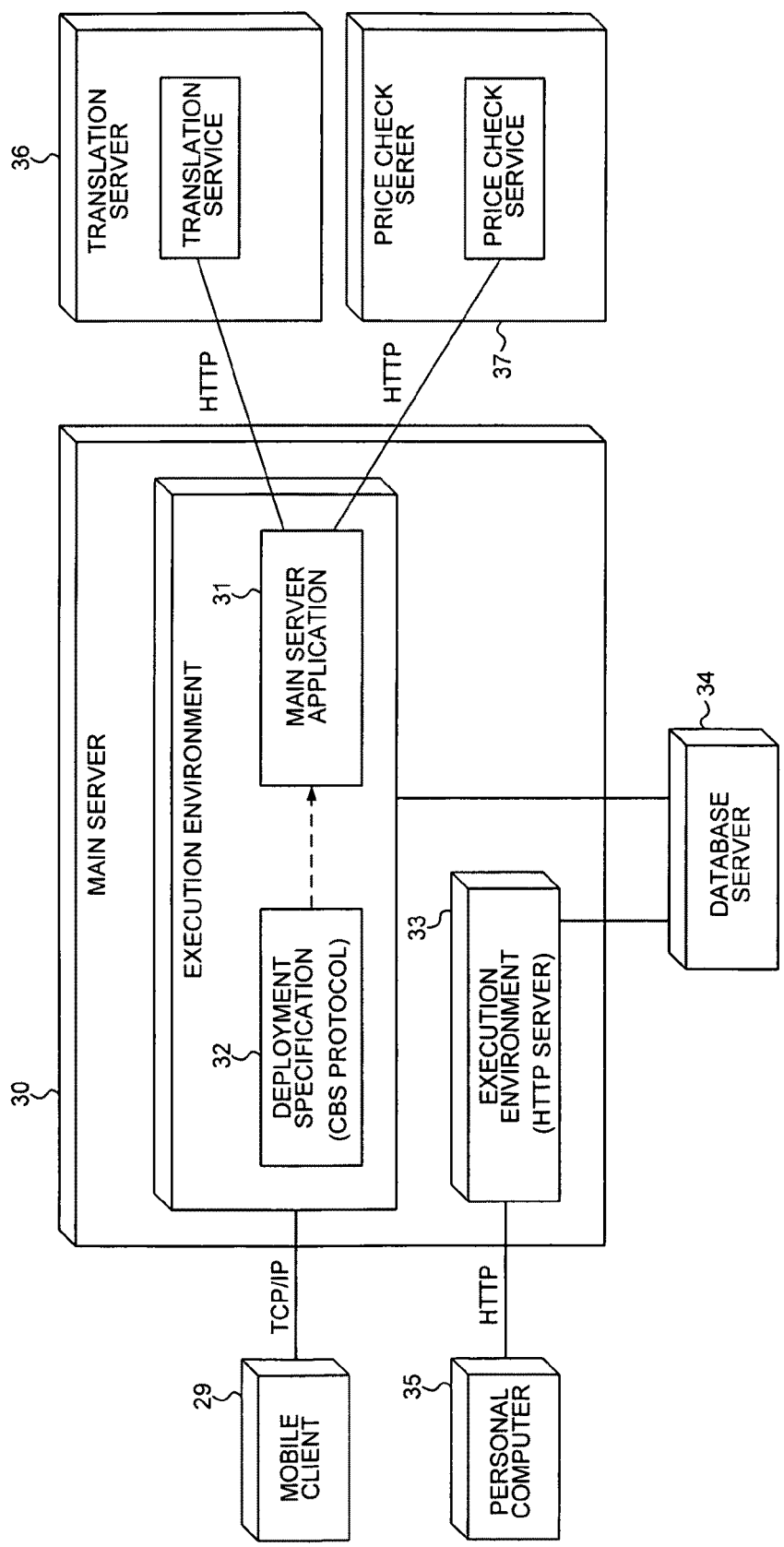
FIG. 6 is schematic diagram of another system according to the present invention.

FIG. 6 is a schematic diagram of a system according to the present invention. FIG. 6 shows a mobile client 29 that communicates with an external main server 30 via a communication network using TCP/IP. The communication network can be a GPRS, UMTS, WLAN or other network. Main server 30 includes an application module 31, a deployment specification 32 and an execution environment 33. Application module 31 processes text data and/or image data received from mobile client 29. Main server 30 processes the received data according to a protocol specified in deployment specification 32. Main server 30 is also connected to a database server 34 that stores the image data, text data and processed data for access via the main server 30 by mobile client 29, as well as by a personal computer 35 or similar device, in real-time or for later use. The personal computer 35 communicates with the main server 30 via the internet using HTTP, for example.

Main server 30 is also connected to one or more sub-servers, such as a translation server 36 and a price check server 37. The sub-servers provide services based on the image data, text data and data processed (pre-processed) in main server 30, for example. In one embodiment, main server 30 also stores accounting and billing information for service providers that offer services based on the camera-based service described herein. Therefore, main server 30 is capable of counting service usage individually for each service provider so that each service provider is able to offer and bill a usage based fee.

Figure 7:
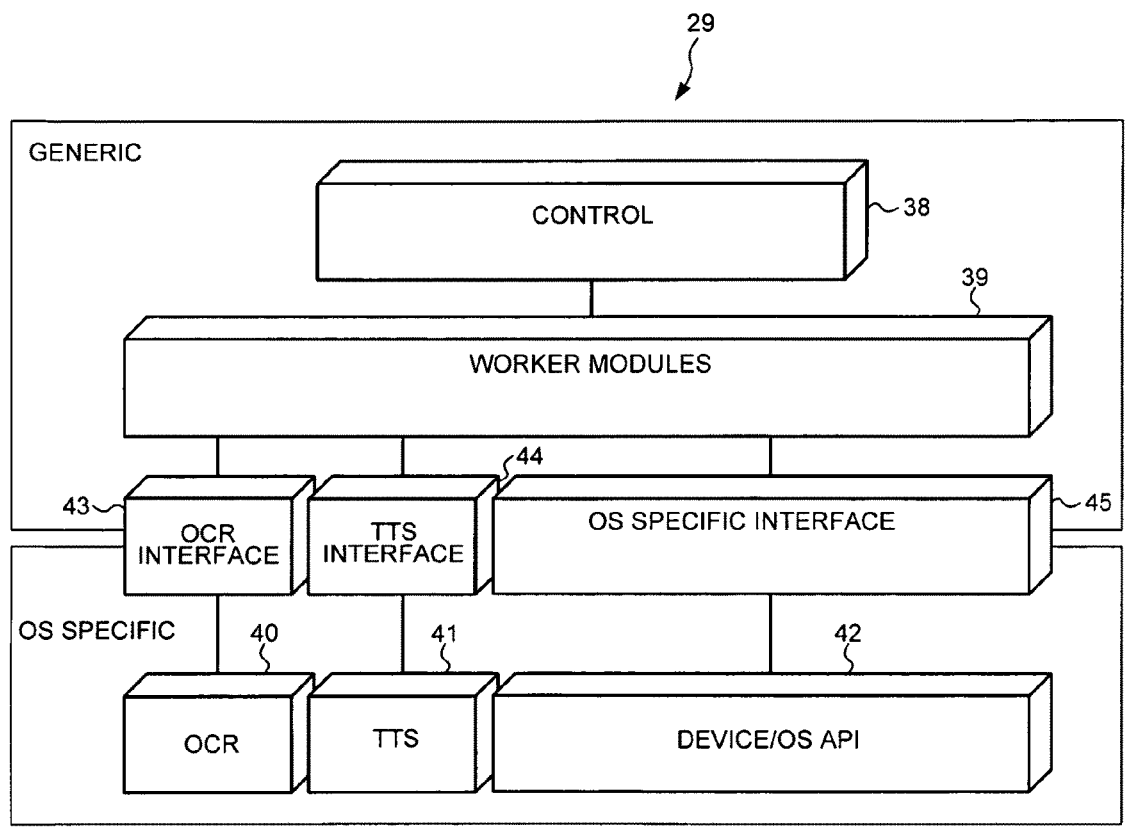
FIG. 7 is a schematic diagram of the software modules of the mobile client of FIG. 6.

FIG. 7 is a schematic diagram of the modular software that provides the functionality to mobile client 29. The modular structure includes a platform-independent control module block 38, a block 39 of worker modules, a platform-dependent optical character recognition (OCR) processing module 40, a text-to-speech (TTS) module 41, and an operating-system-specific application programming interface (API) 42. Platform-independent means the client can be adapted and ported quickly and easily to other mobile phone manufacturers. Blocks 38-39 form a generic part of mobile client 29, whereas API 42 and modules 40-41 are included in an operating-system-specific part of mobile client 29. The generic part is separated from OCR module 40, TTS module 41 and API 42 of the operation-system-specific part by corresponding interfaces 43, 44, and 45, respectively.

Figure 8A:
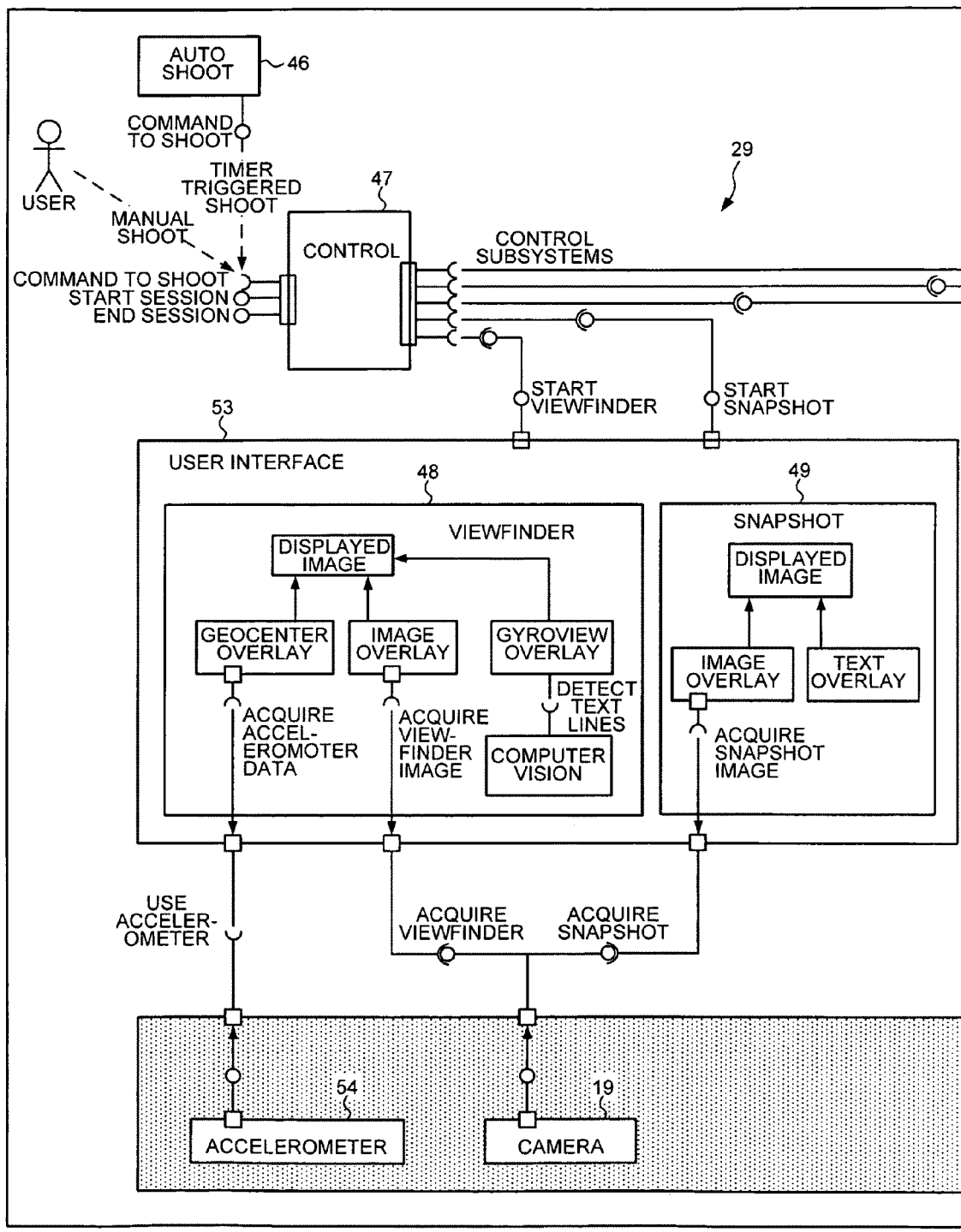
Figure 8B:
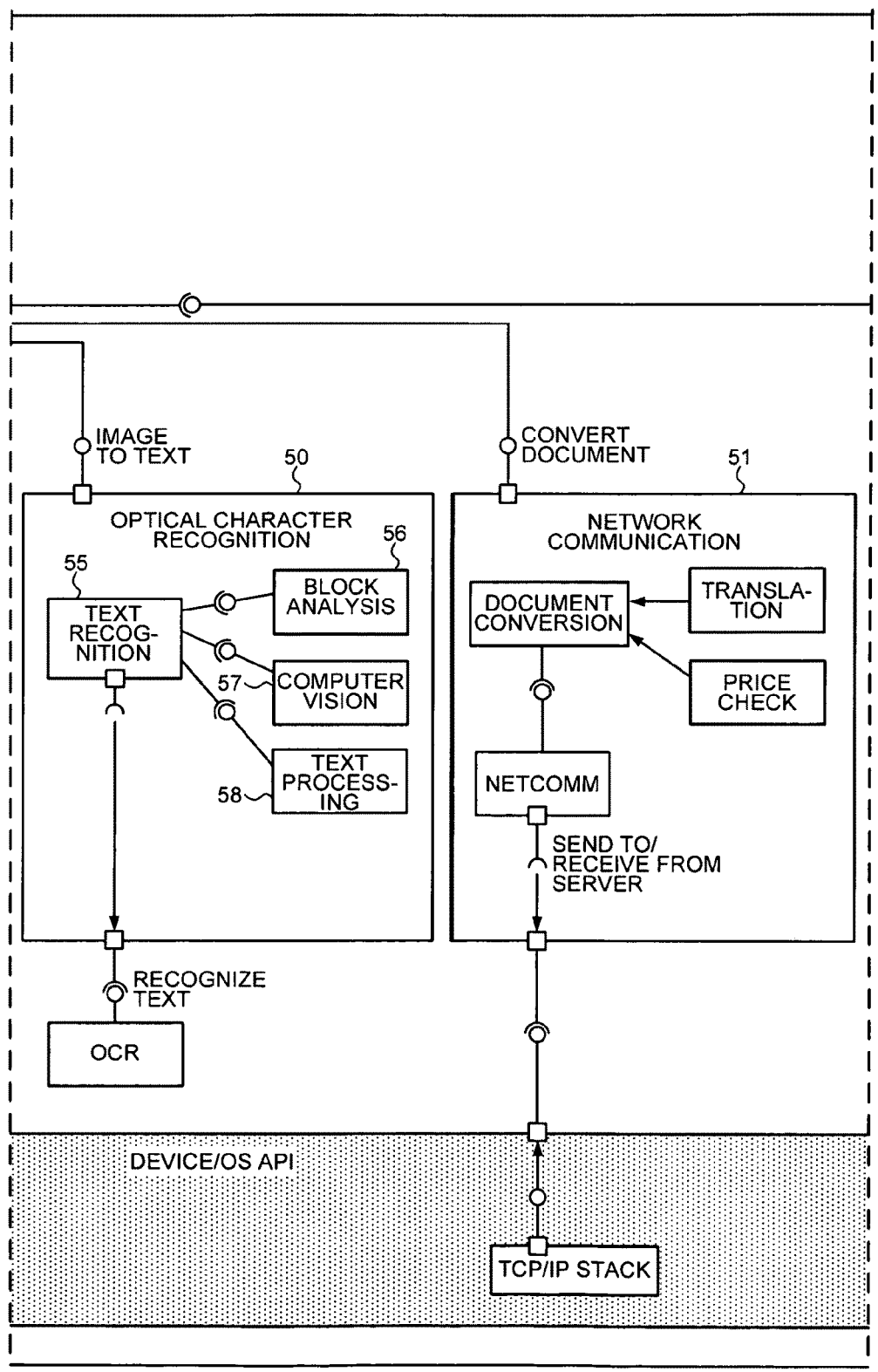

FIG. 8 is a schematic diagram of the circuitry and physical layout of mobile client 29. FIG. 8 includes FIGS. 8A, 8B and 8C, which are to be arranged left to right as shown in the key on together with FIG. 8C. An auto shoot module 46 issues a command to shoot an image after the elapse of a predetermined time so that the user does not have to operate a button by which the position and orientation of the camera might unintentionally be changed. Alternatively, the user can also give the shoot command instead. The user can set the time that must elapse before issuance of a shoot command by auto shoot module 46.

A control module 47 receives the commands input from the user and auto shoot module 46, as well as additional commands such as "start session" and "end session". Accordingly, control module 47 controls a plurality of sub modules (worker modules or subsystems), such as a viewfinder module 48 and a snapshot module 49, an image-to-text module 50 (see FIG. 8B), a convert document module 51 and a speak text module 52 (see FIG. 8C). Viewfinder module 48 and snapshot module 49 are connected to control module 47 via a user interface 53. The additional modules relating to further available services for processing and further processing of image data and text data are not shown in FIG. 8. The worker modules are part of a client application that can be configured dynamically through main server 30 without reinstalling the client application on mobile client 29 such that each worker module can also run on main server 30 in such a manner that load balancing can be realized.

Viewfinder module 48 is responsible for showing a viewfinder when the user directs mobile client 29 including camera 19 to an image for shooting. In one example, viewfinder module 48 shows the image with a reduced resolution of 320×240 pixels, as compared to the image displayed after shooting. Other reduced resolutions are also possible. For assisting image acquisition, image analysis may be performed that detects the orientation of text in the image and displays it as corresponding lines on a display of mobile client 29 overlapping the viewfinder image. This is called GyroviewOverlay as was described above with reference to FIG. 4. In order to avoid distortions of the captured image, such as trapezoidal distortions, information from an accelerometer 54 or G-sensor is used to visualize the horizontal orientation of the mobile client. The feature is called GeocenterOverlay. Snapshot module 49 freezes an image after the image is captured. While the image is displayed in the background, analyzed text may be overlaid on the image. This feature is called TextOverlay.

The image-to-text module 50 shown in FIG. 8B performs optical character recognition (OCR) and includes a text recognition module 55, a block analysis module 56, a computer vision module 57, and a text post-processing module 58. Prior to character recognition, block analysis for finding image areas relevant for optical character recognition, as well as some image processing (pre-processing) is performed. Then, for recognition of characters, conventional OCR software is used. After character recognition, the recognized text is post-processed based on the results of the pre-processing and of the block analysis. If a service offers document conversion but the conversion is not performed by the convert document module 51 itself, the convert document module 51 communicates with an external server such as main server 30 to request a corresponding service such as translation and price check (price search).

The speak text module 52 shown in FIG. 4C converts text to speech. A text-to-speech engine module 59 communicates with a TTS synthesizer module 60, which generates audio data (PCM samples, for example) from the input text data. An audio streamer module 61 routes the audio data to an audio device 62 for sound output. TTS synthesizer module 60 and audio streamer module 61 may each use or access common TTS software.

FIG. 8 also shows the control and communication connections between the sub modules (worker modules) and the application programming interface (API) of the hardware platform of mobile client 29, which includes accelerometer 54, camera 19, a TCP/IP stack, audio device 62, and/or further components as needed.

Figure 9:
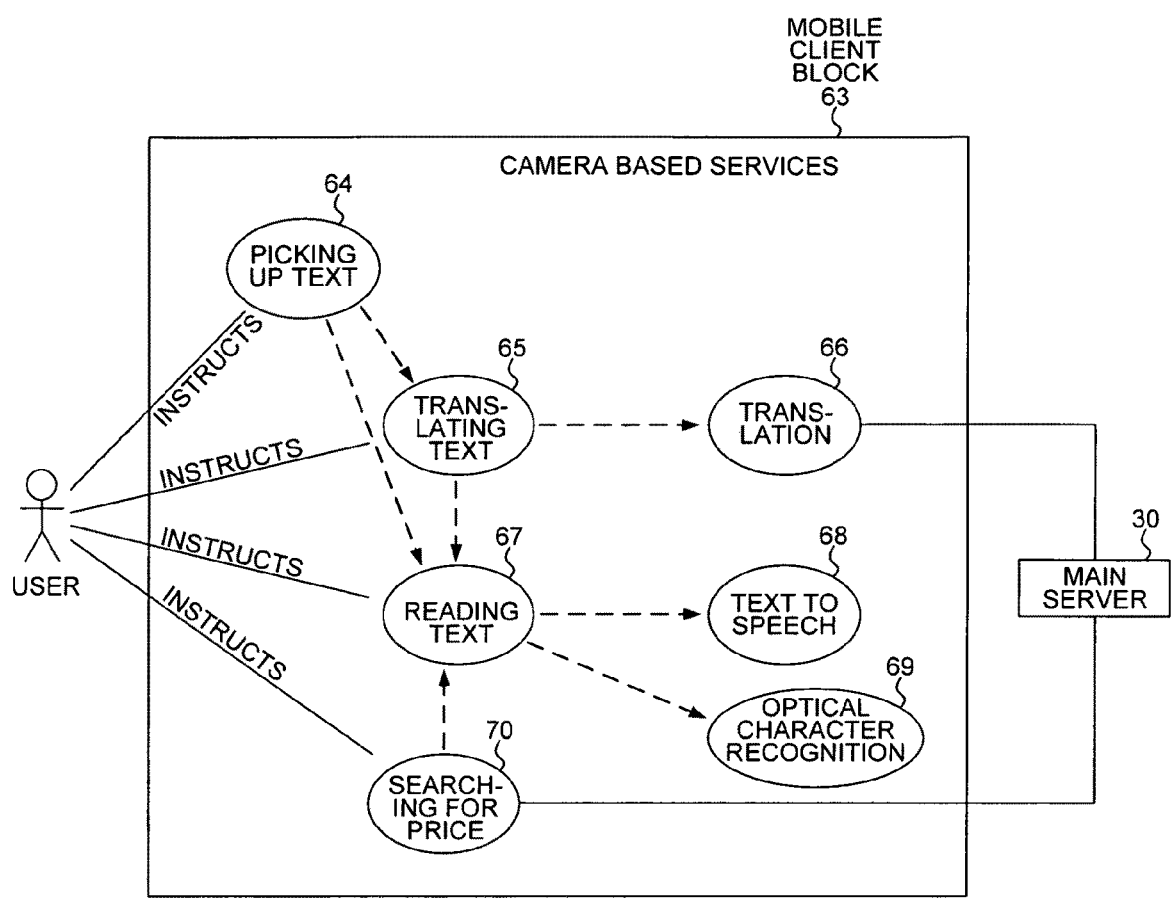
FIG. 9 is a functional schematic diagram showing a mobile client block and a main server.

FIG. 9 is a schematic functional diagram showing a mobile client block 63 and main server 30. First, the user instructs the "picking up text" function 64 to pick up text by shooting an image including text. Then the user may instruct the system to translate text, read text or search for a price of a product represented by the text. When the user instructs the system to translate text by selecting the translating text function 65, the translation function 66 is invoked, which in turn requests a translation service via main server 30. After the text has been translated, the reading text function 67 is invoked. The reading text function 67, in turn, invokes the text-to-speech function 68 for converting the translated text data into speech data. The user may alternatively directly instruct the reading text function in case a translation is not necessary. In this case, the text-to-speech function 68 is also invoked.

The reading text function 67 also invokes the optical character recognition function 69 for obtaining text data from image data acquired from the "picking up text" function 64.

When the user instructs the system to search for a price, the searching for price function 70 invokes the reading text function 67, which in turn invokes the optical character recognition function 69 to obtain text data.

In addition, invoking the searching for price function 70 requests a corresponding service via main server 30, such as searching for the lowest price and the nearest reseller (product search). After receiving price text information and/or product review information, for example, from main server 30, the information may be read and/or shown to the user. The searching for lowest price and nearest reseller or sales person may be performed based on the current location of the user, which is provided by the GPS signal or through GSM cell triangulation.

According to the product search result, the user may also decide to buy the product if a service provider provides a "buy feature". Main server 30 records the transaction for billing the product search feature.

According to the embodiment of FIG. 9, at first it is necessary to pick up text, i.e., an image including text, and to perform OCR. The final result is reading of text via a speech synthesizer (TTS). Depending on the service requested by the user, communication with main server 30 is performed. Main server 30 is adapted to store the processed data for later access by a personal computer, for example, via internet or other suitable communication means. Main server 30 may store the data itself and/or in a separate database server as mentioned above. Other functions corresponding to other services provided by mobile client 29 itself or by or via main server 30 may be correspondingly added according to the principles shown in FIG. 9.

Figure 10:
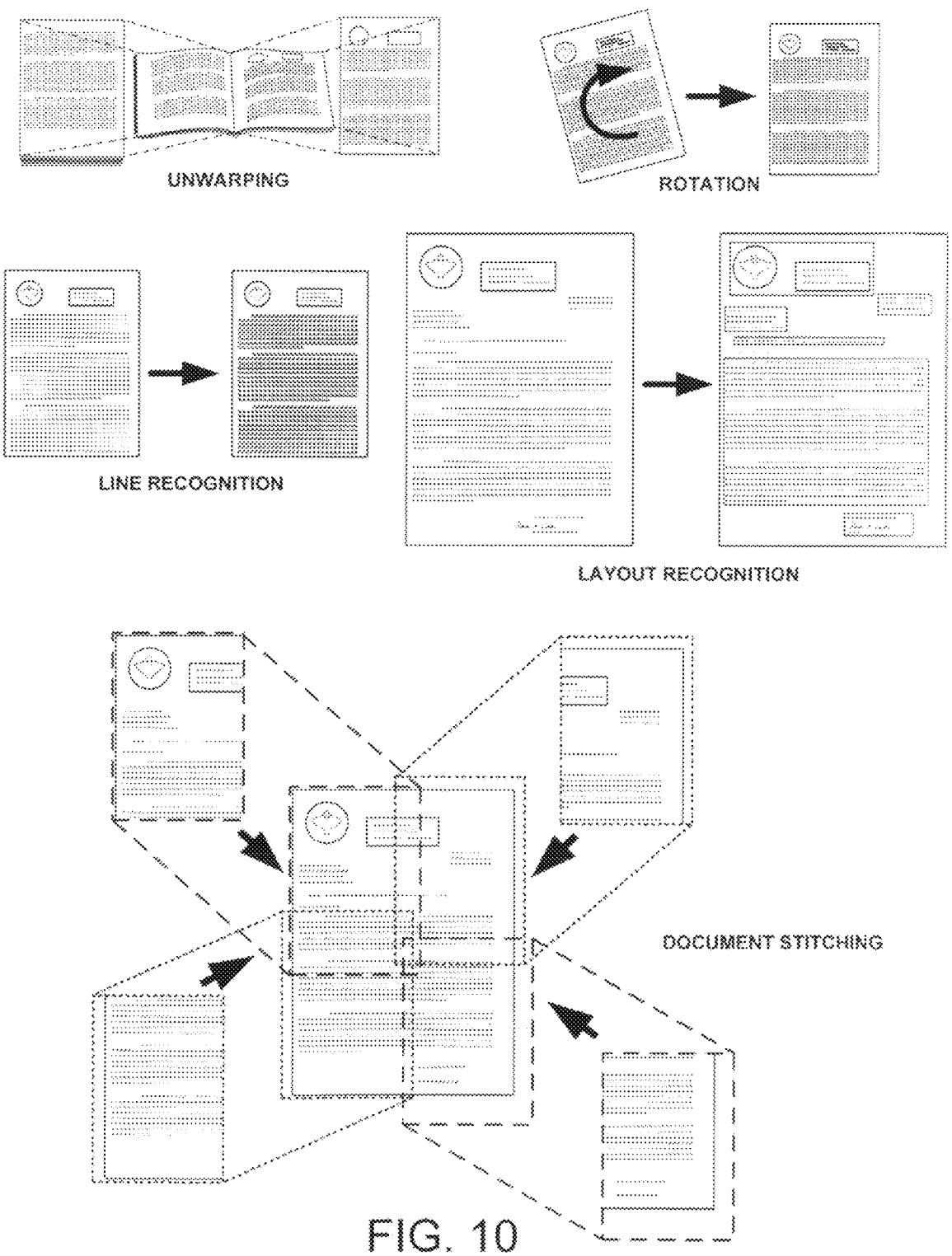
FIG. 10 is a diagram illustrating some exemplary functions performed according to the present invention.

FIG. 10 illustrates how some of the above-mentioned functions are performed.

Figure 11:
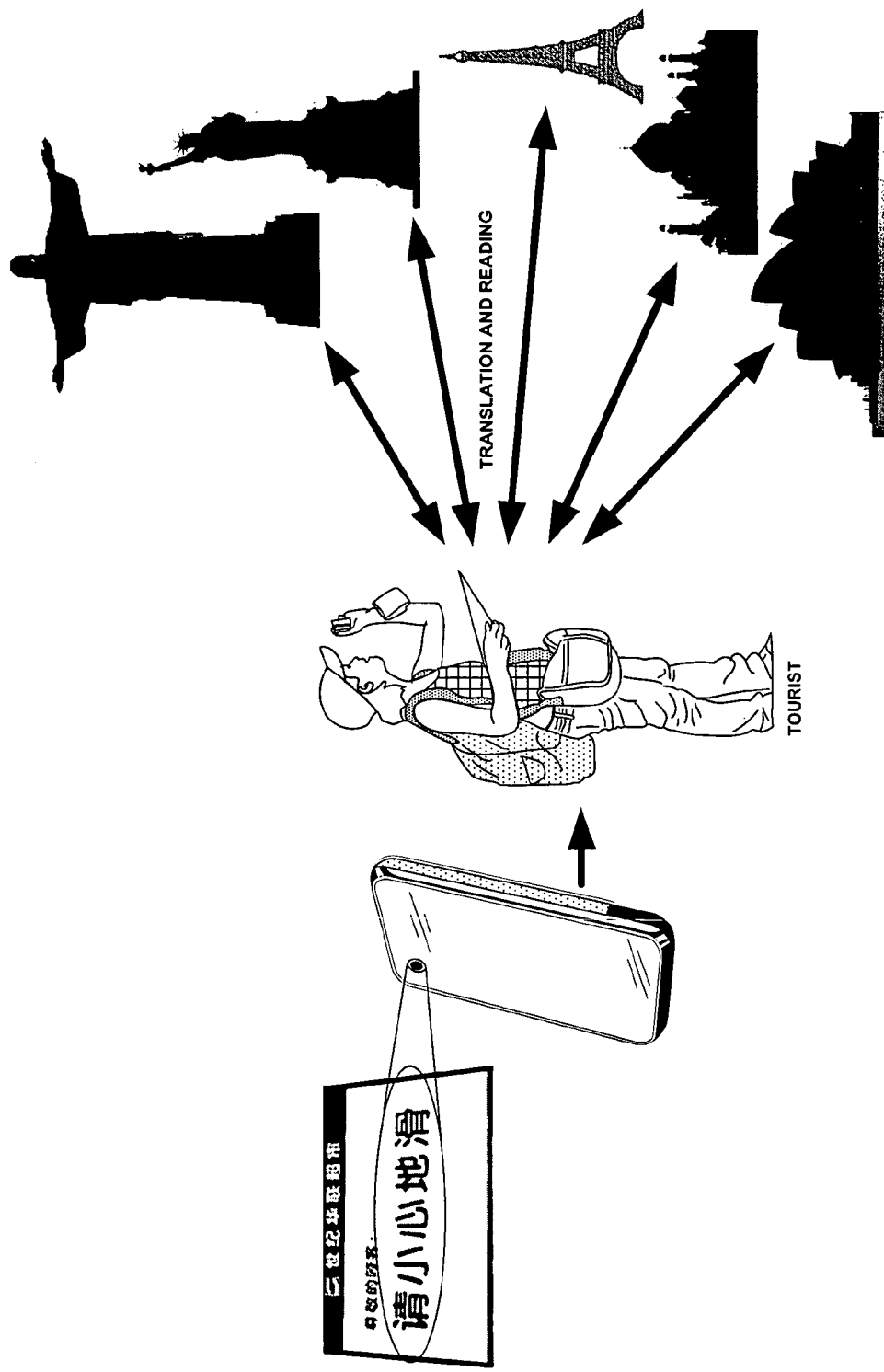
FIG. 11 illustrates a situation in which the present invention is used by a tourist.

FIG. 11 shows a situation in which a tourist takes an image of a text of a foreign language with camera 19 integrated into her mobile phone. The user selects the service of translation of the text and of reading the translated text. When the translation service is requested via main server 30 (or a server 7 in FIG. 1), translation into a variety of other languages is possible without the necessity to provide memory and processing resources in the mobile phone itself. The user specific account information (such as IMSI) for the translation functionality is recorded by the main server for billing.

Figure 12:
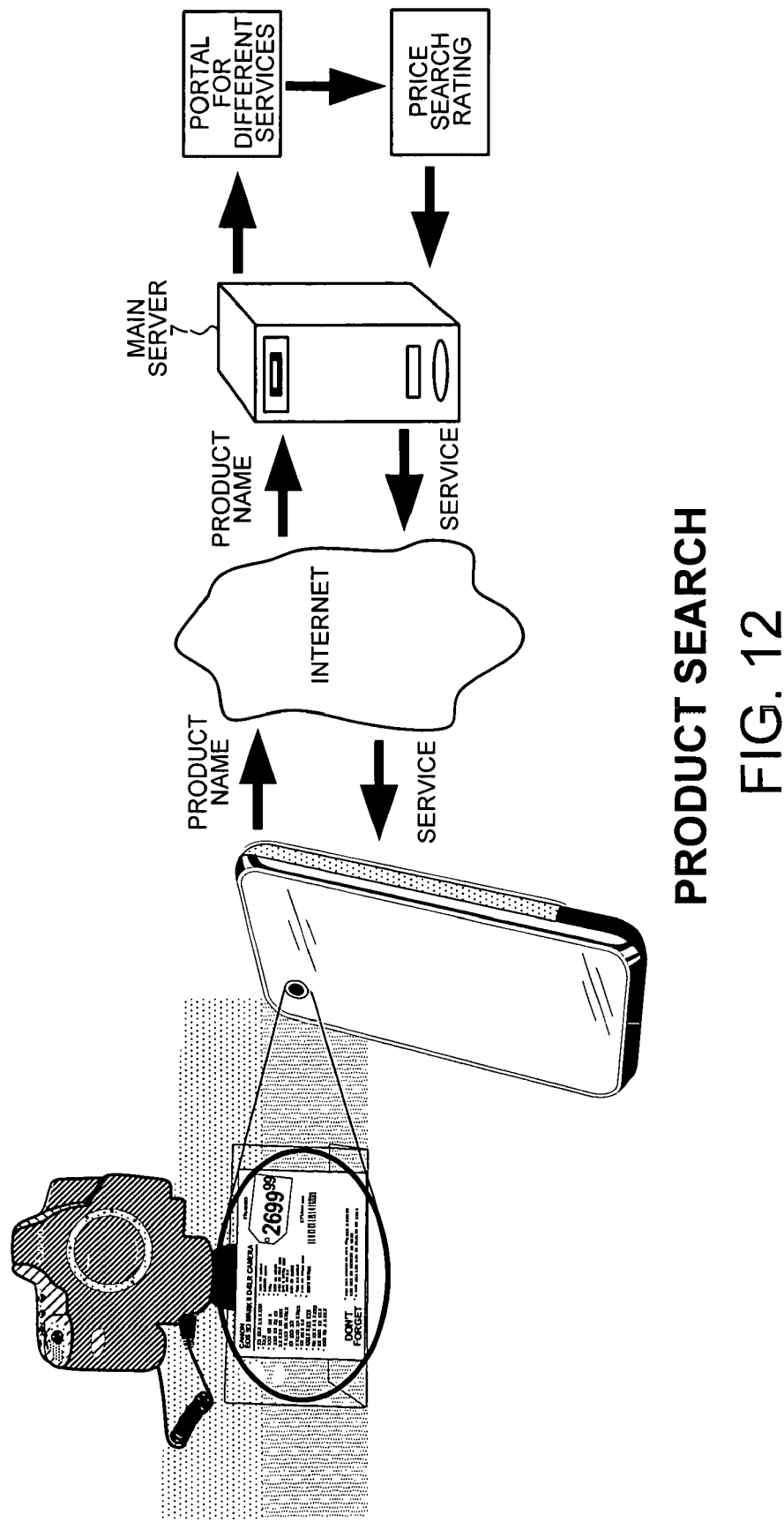
FIG. 12 illustrates a situation in which the present invention is used to search for a product.

FIG. 12 shows a situation in which an image including product data and price information as text is taken with a camera integrated in a mobile phone. The user then requests the service of a price check and product search via main server 30. Main server 30 communicates with a portal for different services, which in turn communicates with further servers or service providers performing price searches, ratings, searching for sales persons in the neighborhood, etc. The result of the search is transmitted to main server 30 and then from main server 30 to the mobile phone for display, for example. Thus, it is not necessary to perform barcode scanning or to input text via the keypad. Moreover, it is possible to integrate location-based services such as searching for sales persons in the neighborhood.

FIG. 13 illustrates a situation in which text is acquired with a camera of a mobile communication device. After having been processed using OCR and TTS, for example, the text is read aloud to a blind, visually impaired or dyslexic user of the mobile communication device. The application illustrated in FIG. 13 is performed off-line.

Figure 14:
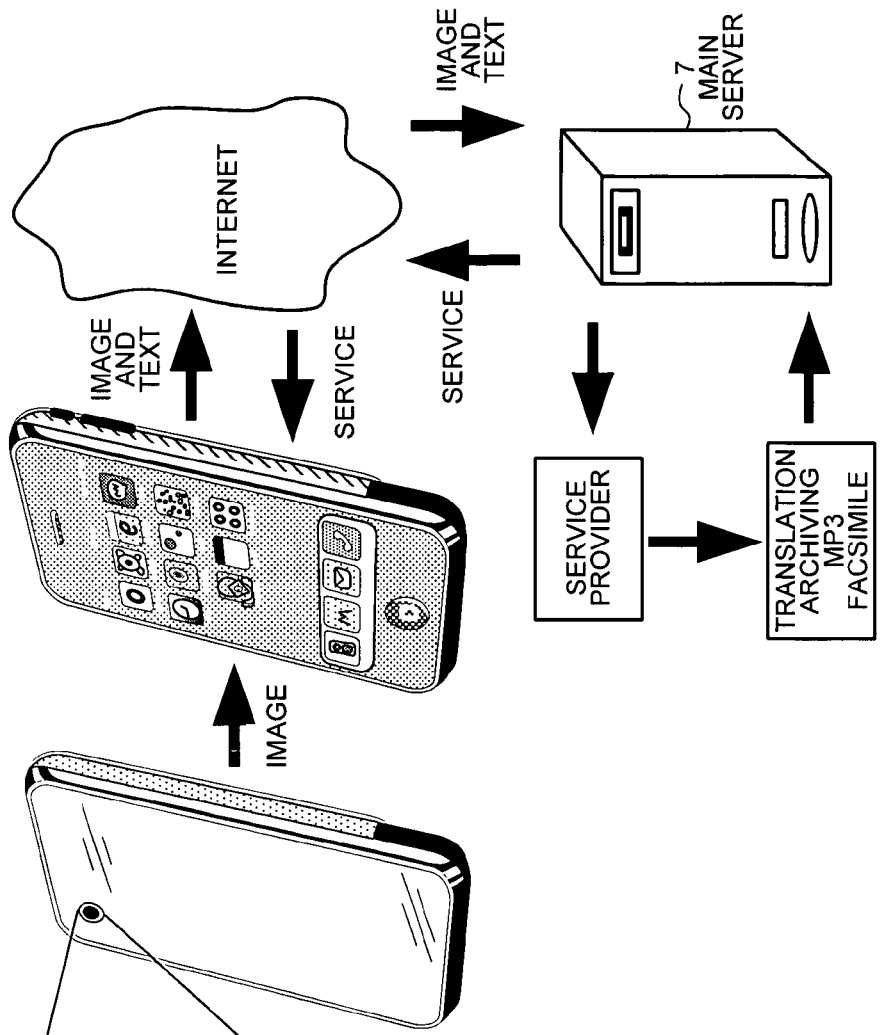
FIG. 14 illustrates an online application performed using recognized text.

FIG. 14 illustrates a situation in which text is taken with a camera of a mobile phone. The image and/or text data is transmitted to the main server, and the main server requests a service provider to provide a service. If the service provider does not itself provide the service, the service provider in turn requests another service provider to provide the service, such as translation, archiving, converting to mp3 format, sending a facsimile including the text data, etc. If necessary, corresponding text-related data are transmitted to the main server and from the main server to the mobile phone according to the requested service.

Figure 15:
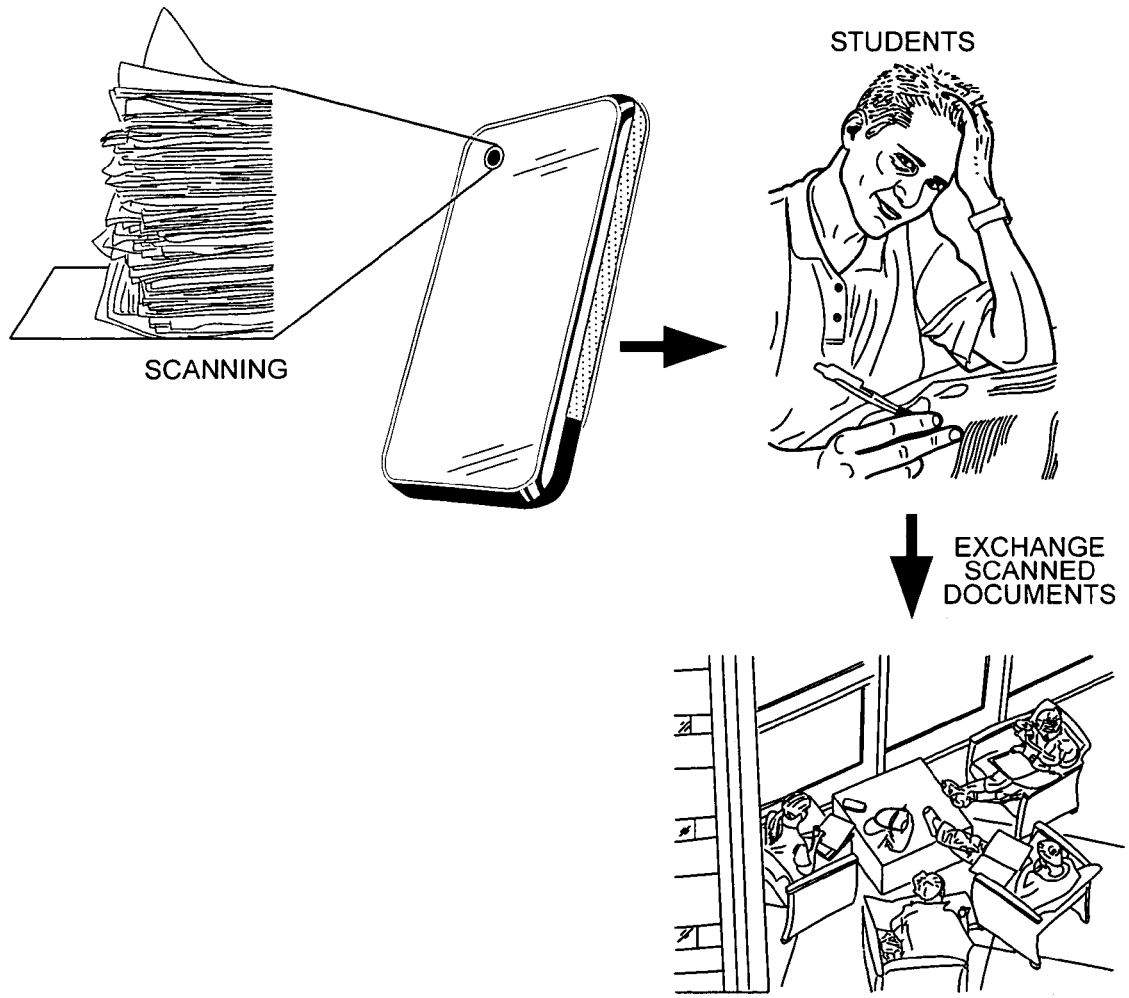
FIG. 15 illustrates an archiving application of the present invention.

The system provides archiving functionality in which text information that is stored on main server 30 is classified by indexing keywords of the received text information, such that the information can be categorized by common keywords. FIG. 15 illustrates a situation in which documents are scanned using a camera of a mobile phone, and are then archived or stored for exchange between students, for example. The archiving and exchange is performed via a server 7, such as main server 30 or another service provider or portal for different services.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
capturing an image of an environment using a camera within a portable communication device so as to obtain image data;
processing the image data such that text data is recognized and extracted from the image data, wherein the processing of the image data is performed by an external processing unit external to the portable communication device, the external processing unit including a first server that communicates with the portable communication device via a first communication network, and the first server processing the image data,
the external processing unit including a second server that communicates with the first server via a second communication network, wherein the second server stores the text data, wherein the first server communicates with a personal computer, and wherein the personal computer accesses the text data on the second server via the first server; and
outputting data related to the text data in a form recognizable by a user of the portable communication device.

2. A method comprising:
capturing an image of an environment using a camera within a portable communication device so as to obtain image data;
processing the image data such that text data is recognized and extracted from the image data, wherein the processing of the image data is performed by an external processing unit external to the portable communication device, the external processing unit including a first server that communicates with the portable communication device via a first communication network, and the first server processing the image data;
performing block recognition, wherein the processing the image data is performed in parallel on image data within recognized blocks; and
outputting data related to the text data in a form recognizable by a user of the portable communication device.

3. A portable communication device, comprising:
a camera adapted to capture an image of an environment, wherein image data obtained from the image is processed to generate text data;
a display adapted to display an indication of a service selectable by a user of the portable communication device;
outputting means that outputs data related to the text data in a form recognizable by the user of the portable communication device, wherein the portable communication device performs the service selected by the user;
a first worker module that displays the image on the display and that detects an orientation of text included in the image;
a second worker module that performs text recognition on the image data to generate the text data; and
a third worker module that converts the text data into speech and generates an audio output, wherein the first, second and third worker modules work independently of one other and communicate with an operation system of the portable communication device via dedicated interfaces;
wherein the first, second and third worker modules are part of a client application, wherein the portable communication device communicates with a server, and wherein the first, second and third worker modules are configured dynamically through the server without reinstalling the client application on the portable communication device.

4. The portable communication device of claim 3, wherein each of the first, second and third worker modules also runs on the server so as to achieve a load balancing.

5. The portable communication device of claim 3, further comprising:
a service module that communicates with a server and requests performance of the service selected by the user.

6. A method comprising:
capturing an image of an environment using a camera within a portable communication device so as to obtain image data;
processing the image data such that text data is recognized and extracted from the image data, wherein the processing of the image data is performed by an external processing unit external to the portable communication device, the external processing unit including a first server that communicates with the portable communication device via a first communication network, and the first server processing the image data, the external processing unit further including a second server that communicates with the first server via a second communication network and that stores the image data;
the portable communication device accessing the image data in real-time from the second server; and
outputting data related to the text data in a form recognizable by a user of the portable communication device.

7. The method of claim 6, wherein the second server stores the text data, wherein the first server communicates with a personal computer, and wherein the personal computer accesses the text data on the second server via the first server.

8. The method of claim 6, further comprising:
performing block recognition, wherein the processing the image data is performed in parallel on image data within recognized blocks.

9. The method of claim 6, wherein the image data are stored in association with position data indicating a position where the image was captured.

10. A method comprising:
capturing an image of an environment using a camera within a portable communication device so as to obtain image data;
performing block recognition on the image data by segmenting the obtained image data into blocks thereby obtaining block image data per block;
processing the block image data such that text data is recognized and extracted from the block image data,
wherein the processing the block image data is performed such that text data is recognized and extracted from the block image data in parallel of the respective block image data of the recognized blocks; and
outputting data related to the text data in a form recognizable by a user of the portable communication device.

\* \* \* \* \*